US012614317B2

(12) United States Patent
Tv

(10) Patent No.: US 12,614,317 B2
(45) Date of Patent: Apr. 28, 2026

(54) VIRTUAL WORLD ENVIRONMENTS FOR ENTERPRISE DECISION-MAKING

(71) Applicant: SAP SE, Walldorf (DE)

(72) Inventor: Ramalingam Tv, Calgary (CA)

(73) Assignee: SAP SE, Walldorf (DE)

( * ) Notice: Subject to any disclaimer, the term of this patent is extended or adjusted under 35 U.S.C. 154(b) by 342 days.

(21) Appl. No.: 18/388,436

(22) Filed: Nov. 9, 2023

(65) Prior Publication Data

US 2025/0157088 A1 May 15, 2025

(51) Int. Cl.
| | |
|---|---|
| *G06F 3/048* | (2013.01) |
| *G06F 3/16* | (2006.01) |
| *G06N 20/00* | (2019.01) |
| *G06T 11/00* | (2006.01) |

(52) U.S. Cl.
CPC .............. *G06T 11/00* (2013.01); *G06F 3/167* (2013.01); *G06N 20/00* (2019.01); *G06T 2200/24* (2013.01)

(58) Field of Classification Search
CPC .......... G06T 11/00; G06N 20/00; G06F 3/167
See application file for complete search history.

(56) References Cited

U.S. PATENT DOCUMENTS

| | | | | |
|---|---|---|---|---|
| 12,008,008 | B2 * | 6/2024 | Chakra | G06F 16/248 |
| 12,491,637 | B2 * | 12/2025 | Cella | G05B 13/048 |
| 12,536,753 | B2 * | 1/2026 | Miller | G06F 3/011 |
| 2019/0102921 | A1 * | 4/2019 | Mittal | G06F 3/0481 |
| 2020/0353621 | A1 * | 11/2020 | Li | G06N 3/08 |
| 2021/0287139 | A1 * | 9/2021 | Belyaev | G06N 20/00 |
| 2021/0383300 | A1 * | 12/2021 | Vollmert | G06F 3/0482 |
| 2025/0094186 | A1 * | 3/2025 | Balasubramanian | |
| | | | | G06Q 20/4016 |
| 2025/0157088 | A1 * | 5/2025 | Tv | G06N 5/01 |
| 2025/0165803 | A1 * | 5/2025 | Huang | G06N 3/0475 |
| 2025/0377646 | A1 * | 12/2025 | Cella | H02J 3/381 |
| 2025/0390526 | A1 * | 12/2025 | Kundel | G06F 16/3344 |
| 2025/0391283 | A1 * | 12/2025 | Rakshit | G06T 11/00 |
| 2026/0044511 | A1 * | 2/2026 | Zawideh | G06F 16/24553 |

* cited by examiner

*Primary Examiner* — David Phantana-angkool
(74) *Attorney, Agent, or Firm* — SCHWEGMAN LUNDBERG & WOESSNER, P.A.

(57) ABSTRACT

In an example embodiment, machine learning is utilized to create a virtual world where a user can view and interact with data in a graphical environment. This virtual world may be termed a "Story Verse" environment, which can create multiple different virtual world universes capable of segmenting the traditional complexities of Enterprise system data into an easily usable and holistic set. In a further example embodiment, the virtual world is presented in a way that data is represented as real world objects, such as amusement park rides, clouds, etc.

20 Claims, 11 Drawing Sheets

100

USER 108A

USER 108B

USER 108C

CONSTELLATION OF STORYVERSES 106

STORYVERSE 104A

STORYVERSE 104B

STORYVERSE 104C

STORYVERSE CREATION COMPONENT 102

SIMULATION APPARATUS 120

TRAIN

STORYVERSE-SPECIFIC TRAINING DATA 122

SOURCE DATA--SPECIFIC TRAINING DATA 124

USER INFORMATION 112

MAP ENGINE 114

APPLICATION 110

IOT COMPONENT 116

APPLICATION LIBRARY 118

VIRTUAL WORLD ENVIRONMENTS FOR ENTERPRISE DECISION-MAKING

BACKGROUND

Enterprise systems contain massive amounts of data used in decision-making. Presenting this data in a way a user can understand can be quite challenging. There is generally too much data in such systems to easily be presented textually.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Interaction with data is never easy, and this is especially true of Enterprise systems, where data is often gathered from multiple heterogenous systems and may exist as many different data types and user environments. Handling of such data is very complex and inferring its usage to arrive at a better decision state is only possible using complex operations, investment of resources, technical challenges, efforts, and expansive time intervals.

In an example embodiment, machine learning is utilized to create a virtual world where a user can view and interact with data in a graphical environment. This virtual world may be termed a "Storyverse" environment, which can create multiple different virtual world universes capable of segmenting the traditional complexities of Enterprise system data into an easily usable and holistic set. In a further example embodiment, the virtual world is presented in a way that data is represented as real world objects, such as amusement park rides, clouds, etc.

The user is able to be immersed into a set of virtual worlds with various objects created using Enterprise system data, allowing the user to easily grasp the essence of the underlying data.

Each storyverse represents a new set of constellations built by a machine learning system based on underlying Enterprise system data. This building is performed dynamically using data from one or more Enterprise systems, user data preferences, a training data set, and a simulator that trains the storyverse system.

Figure 1:
FIG. 1 is a block diagram illustrating a system, in accordance with an example embodiment.
Figure 1:

FIG. 1 is a block diagram illustrating a system 100, in accordance with an example embodiment. A storyverse creation component 102 creates one or more storyverses 104A, 104B, 104C stored in a constellation of storyverses 106. This includes building the objects and how the objects relate to the Enterprise system data, as well as how users are depicted in each storyverse 104A, 104B, 104C and how they interact with the objects.

Once created, each storyverse 104A, 104B, 104C may be interacted with by one or more users. While each storyverse 104A, 104B, 104C can depict data in a different way (or perhaps, different data in a similar way to other storyverses), they need not be completely separate. A user, for example, can transition from one storyverse to another, possibly by interacting in a specific way with the storyverse they are currently viewing. For example, the user may pick up a particular object in one storyverse to be transported to another storyverse related to that object. Alternative, if the storyverse is, for example, a virtual amusement park, the user may exit the gates of the virtual amusement park and enter the gates of a different virtual amusement park to enter a different storyverse. Other ways of navigating from one storyverse to another include jumping, flying, taking a train, tram or bus, driving a car, riding a bike, walking, running, hiking, etc.

One or more users 108A, 108B, 108C can interact with an application 110 that facilitates interaction with constellation of storyverses 106. In an example embodiment, application 110 may execute in a cloud environment and thus may be essentially shared by the one or more users 108A, 108B, 108C (although in some circumstances this sharing may involve sharing the application 110 but each user can possibly be assigned their own instance of the application 110). In some example embodiments, the users 108A, 108B, 108C may operate client applications or a client-side of the application 110 on their own devices such as desktop computers, laptop computers, mobile devices, etc. to communicate with the application 110. In other example embodiments, application 110 may have its own front-end, such as one presented via a web page.

The one or more users 108A-108C may interact with the application 110 using a number of different interaction mechanisms, such as by using a mouse, touchscreen, or even via audio prompts (voice control).

Regardless, the application 110 may contain user information 112. This user information may include information about personalizing the various aspects of the corresponding storyverse 104A-104C for the user, such as what actions the user can performed, behavior of objects for the user, a user feature set, user environments, device set, user location, etc. The application 110 may also include other components, such as a map engine 114 that connects to as map server to bring up real-world geographical information (if, for example, the virtual world is depicted as being in Paris, real street names and locations could be used via the map engine 114), Internet-of-Things (IoT) component 116 that connects to various IoT devices, and application library 118, which contains information and application program interfaces (API) for connecting to Enterprise systems.

The application 110 communicates with the storyverse creation component 102 to actually create the one or more storyverses 104A-104C.

Figure 2:
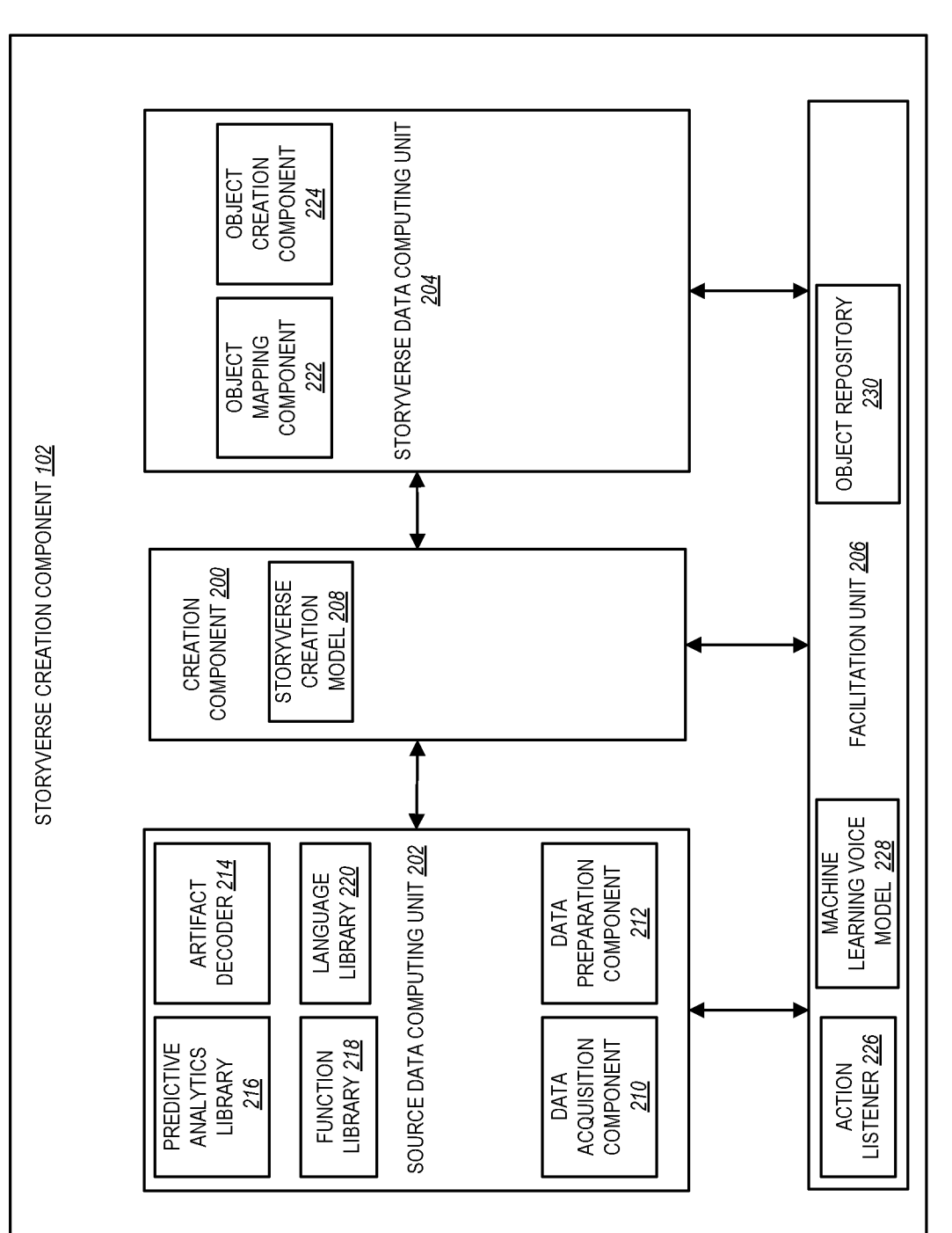
FIG. 2 is a block diagram illustrating the storyverse creation component in more detail, in accordance with an example embodiment.

FIG. 2 is a block diagram illustrating the storyverse creation component 102 in more detail, in accordance with an example embodiment. A creation component 200 acts as a main hub for the creation of the one or more storyverses 104A-104C, exchanging information to and from a source data computing unit 202, a storyverse data computing unit 204, and a facilitation unit 206. A machine learning model, known here as a storyverse creation model 208 within the creation component 200 handles the actual creation of the one or more storyverses 104A-104C, based on training conducted using a machine learning algorithm. The training and inner workings of the storyverse creation model 208 will be described in more detail below.

The storyverse creation model 208 obtains source Enterprise system data from the source data computing unit 202. Specifically, the source data computing unit 202 connects to one or more Enterprise systems (not pictured) to obtain relevant Enterprise system data. The choice of which data to obtain and how to obtain the data may be performed by a data acquisition component 210. The data acquisition component 210 may utilize one or more stored rules to determine which data to obtain and how to obtain the data. Alternatively, or in conjunctions with the rules, a separately trained machine learning model called a data acquisition model can be contained in the data acquisition component 210 and perform the determination of which data to obtain and how to obtain the data.

The data acquisition model may be trained using a first machine learning algorithm. In an example embodiment, the first machine learning algorithm may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

The first machine learning algorithm may be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

The first machine learning algorithm trains the data acquisition model to learn how to acquire data from the Enterprise systems. This may include learning, for example, which tables to extract data from, and which data to extract from those tables. Therefore, at runtime, the data acquisition model is used to actually obtain data in real time from the corresponding Enterprise system(s) so it can be used to create one or more storyverses 104A-104C.

Once the data is obtained, it still must be put into a form that is usable by the creation component 200. This may be the function of the data preparation component 212, which may operate to take the data obtained by the data acquisition component 210 and perform one or more transformations on it to produce data in a form and type needed by the creation component 200. This may include the use of an artifact decoder 214, which acts to decode artifacts in the data, and a predictive analytics library 216, which is used to determine which analytics to perform on the data. More specifically, presenting large amounts of data to a user may involve providing some level of summarization of some or all of the relevant data rather than presenting the data itself (unless, of course, the user requests the raw data). In Enterprise system data, this summarization may take the form of metrics and/or analytics, which are computed values to help in the analysis of data. For example, a metric may indicate what percentage of sales during a particular year came from which country. This may be more useful to a user who is trying to decide which countries to focus next year's sales on than seeing raw transaction information from around the world, which may be overwhelming to most users and make analysis more difficult.

Referring back to the data acquisition component 210, in order to interface with multiple different Enterprise systems, this component may include a function library 218, which may include, for example, business functions and application functions, as well as Application Program Interfaces (APIs) used to access and interpret data from the various different Enterprise systems. The data acquisition component 210 may also include a language library 220, which contains information on various different computer languages, such as R, ABAP, Ruby, etc., used to communicate with the different Enterprise systems.

Turning now to the storyverse data computing unit 204, the function of this unit is to determine how to actually display the Enterprise system data to a user in a storyverse. This may include how to display data at a high level (e.g., what the storyverse looks like as a whole), as well how to display data at a lower level (e.g., which objects in the storyverse will represent which data, and how that data will be represented visually and interacted with). In doing, the storyverse data computing unit 204 may include an object mapping component 222, which maps pieces of data (typically metrics but not necessarily) to objects in a storyverse. The storyverse data computing unit 204 may utilize one or more rules in performing this mapping. Alternatively, or in conjunctions with the rules, a separately trained machine learning model called an object mapping model can be contained in the object mapping component 222 and perform the mapping.

The object mapping model may be trained using a second machine learning algorithm. In an example embodiment, the second machine learning algorithm may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

The second machine learning algorithm may be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

The second machine learning algorithm trains the object mapping model to learn how to map data from an Enterprise system to object(s) in a storyverse 104A-104C. At runtime, the object mapping model is able to create a real-time mapping of Enterprise data to objects, and this mapping can then be used in creating and rendering the corresponding objects.

An object creation component 224 then performs the task of actually creating the corresponding object(s) in the corresponding storyverse(s). This may include initiating the object (e.g., generating a three dimensional model representing the object in the storyverse), grading the object (e.g., changing its size, color, or other characteristics based on the data), and locating the object (e.g., determining where the object should be placed in the storyverse).

The facilitation unit 206 acts in a supporting role to aid in the creation and modification of the storyverse. More specifically, the facilitation unit 206 may include an action listener 226, which listens (monitors) for actions performed by a user or others in the storyverse and passes information about those actions to the storyverse data computing unit 204, which may modify one or more objects, environments, or even the storyverse as a whole based on these actions. For example, if the storyverse is a virtual amusement park representing Enterprise data regarding sales in 2023, and each amusement park ride represents a different metric of that data, then if the user navigates away from one amusement park ride (e.g., a carousel) to another amusement park ride (e.g., a roller coaster), this action is identified by the action listener 226 and passed to the storyverse data computing unit 204 so that objects pertaining to the correct environment can be created (E.g., roller coaster objects instead of carousel objects).

The interactions from the user to the storyverse may also take the form of, as described earlier, voice commands. Here, a machine learning voice model 228 may be utilized to convert the spoken voice commands into text so that the proper action can be interpreted and passed to the storyverse data computing unit 204.

The facilitation unit 206 may also include an object repository 230, which is a storage containing already-created objects (either those created dynamically by the object creation component 224) or pre-built objects created for previous storyverses or created by an administrator or user.

Referring back to FIG. 1, a simulation apparatus 120 is used to train the various machine learning models used in the storyverse creation component 102. This training may include not just the training of the models themselves but validation of the models prior to training being considered complete.

The training set used to train the various models may include storyverse specific training data 122 and source data specific training data 124. The storyverse specific training data 122 may include data such as videos, audios, text, environmental monument structures, spatial data, virtual reality-based data, sentiment, templates, and activity. The source data specific training data 124 may include data such as system data, user preferences, artifacts, and visualizations.

In an example embodiment, the data that is retrieved to obtain the metrics used to display objects in the corresponding storyverse 104A-104C is retrieved from Enterprise Resource Planning (ERP) software. ERP software integrates into a single system various processes used to run an organization, such as finance, manufacturing, human resources, supply chain, services, procurement, and others. These processes typically provide intelligence, visibility, and efficiency across most if not all aspects of an organization. One Example of ERP software is SAP® S/4 HANA from SAP SE of Walldorf, Germany.

More particularly, the data retrieved from an ERP may include data from one or more base tables. A base table (also known as a system base table or system table), is an underlying table that stores metadata for a specific database. In SAP® S/4 HANA, a base table is called ACDOCA.

In some embodiments, the one or more base tables are copied over from the ERP. It should be recognized, however, that this may or may not occur in implementation. In other words, in some example embodiments, the storyverse creation component 102 is able to work directly from the one or more base tables in the ERP without needing to copy them and store them locally in a repository. In addition to the one or more base tables, one or more data tables from the ERP may also be retrieved.

Figure 3:
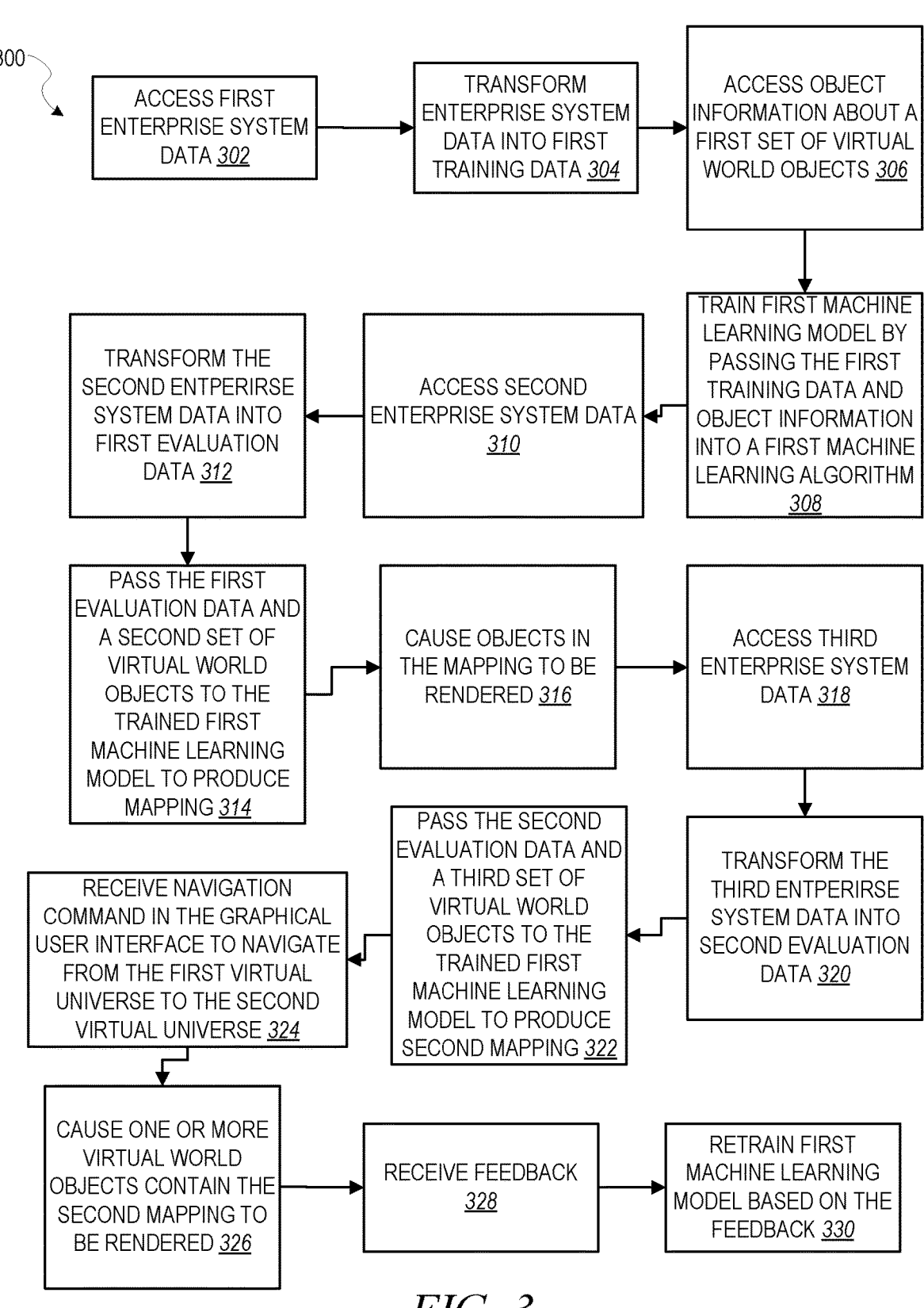
FIG. 3 is a flow diagram illustrating a method, in accordance with an example embodiment.

FIG. 3 is a flow diagram illustrating a method 300, in accordance with an example embodiment. At operation 302, first enterprise system data are accessed. At operation 304, the enterprise system data is transformed into first training data. At operation 306, object information about a first set of virtual world objects is accessed. At operation 308, a first machine learning model is trained by passing the first training data and the object information into a first machine learning algorithm. The training causes the first machine learning model to learn how to create a mapping between enterprise system data and virtual world objects.

At operation 310, second enterprise system data is accessed. At operation 312, the second enterprise system data is transformed into first evaluation data. The first evaluation data may include one or more metrics computed from the second enterprise system data. At operation 314, the first evaluation data and a second set of virtual world objects are passed to the trained first machine learning model to produce a mapping between the first evaluation data and the second set of virtual world objects.

At operation 316, one or more virtual world objects contained in the produced mapping are caused to be rendered in a graphical user interface. The one or more virtual world objects are representations of real-world objects. The rendering may include representing the one or more metrics using the one or more virtual world objects without text. Further, the rendering may include rendering the one or more virtual world objects in a first virtual universe, the first virtual universe corresponding to the second enterprise system data.

At operation 318, third enterprise system data are accessed. The third enterprise system data corresponds to an identical enterprise as the second enterprise system data. At operation 320, the third enterprise system data is transformed into second evaluation data. At operation 322, the second evaluation data and a third set of virtual world objects in a second virtual universe are passed to the trained first machine learning model to produce a mapping between the second evaluation data and the third set of virtual world objects.

At operation 324, a navigation command is received in the graphical user interface to navigate from the first virtual universe to the second virtual universe. The navigation command may include a movement of an avatar in the first virtual universe and/or may be a voice command.

At operation 326, in response to the receiving of the navigation command, one or more virtual world objects contained in mapping between the second evaluation data and the third set of virtual world objects are caused to be rendered in a graphical user interface.

At operation 328, feedback is received via user interactions with the graphical user interface. This feedback can be either automatic or manual. For automatic, separate sophisticated machine learning models can be used to evaluate performance for the user and provide feedback, whereas for manual, a user can actively provide feedback themselves about performance. At operation 330, the first machine learning model is caused to be retrained based on the feedback.

Figure 4:
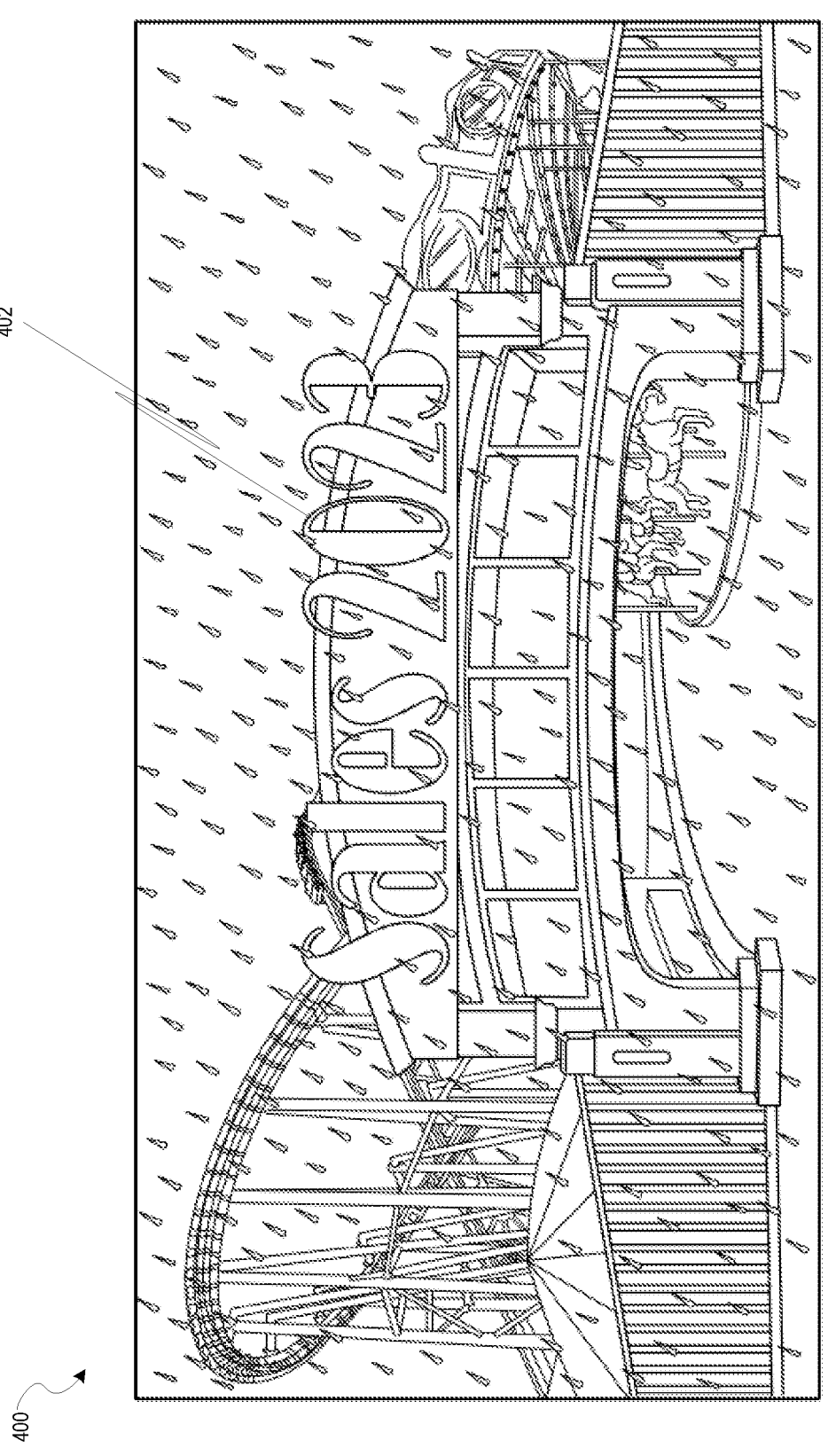
FIG. 4 is a diagram illustrating a first screen capture of a first virtual universe, in accordance with an example embodiment.

FIG. 4 is a diagram illustrating a first screen capture 400 of a first virtual universe, in accordance with an example embodiment. Here, the first screen capture 400 depicts a virtual amusement park entrance. The entrance is depicted with the title "Sales 2023" 402, indicating that the Enterprise system data reflected in the virtual amusement park is related to sales data from the year 2023. Also depicted is rain, which indicates that the overall sales for the year are negative. The degree in which it is raining in the first screen capture 400 is indicative of the level of negativity of the sales.

It should be noted that the weather conditions, such a rain, snow, sun, etc. are all customizable by the user(s).

The user may navigate an avatar (not pictured) through the gates of the virtual amusement park to get the opportunity to view more details about the data via one or more virtual amusement park rides.

Figure 5:
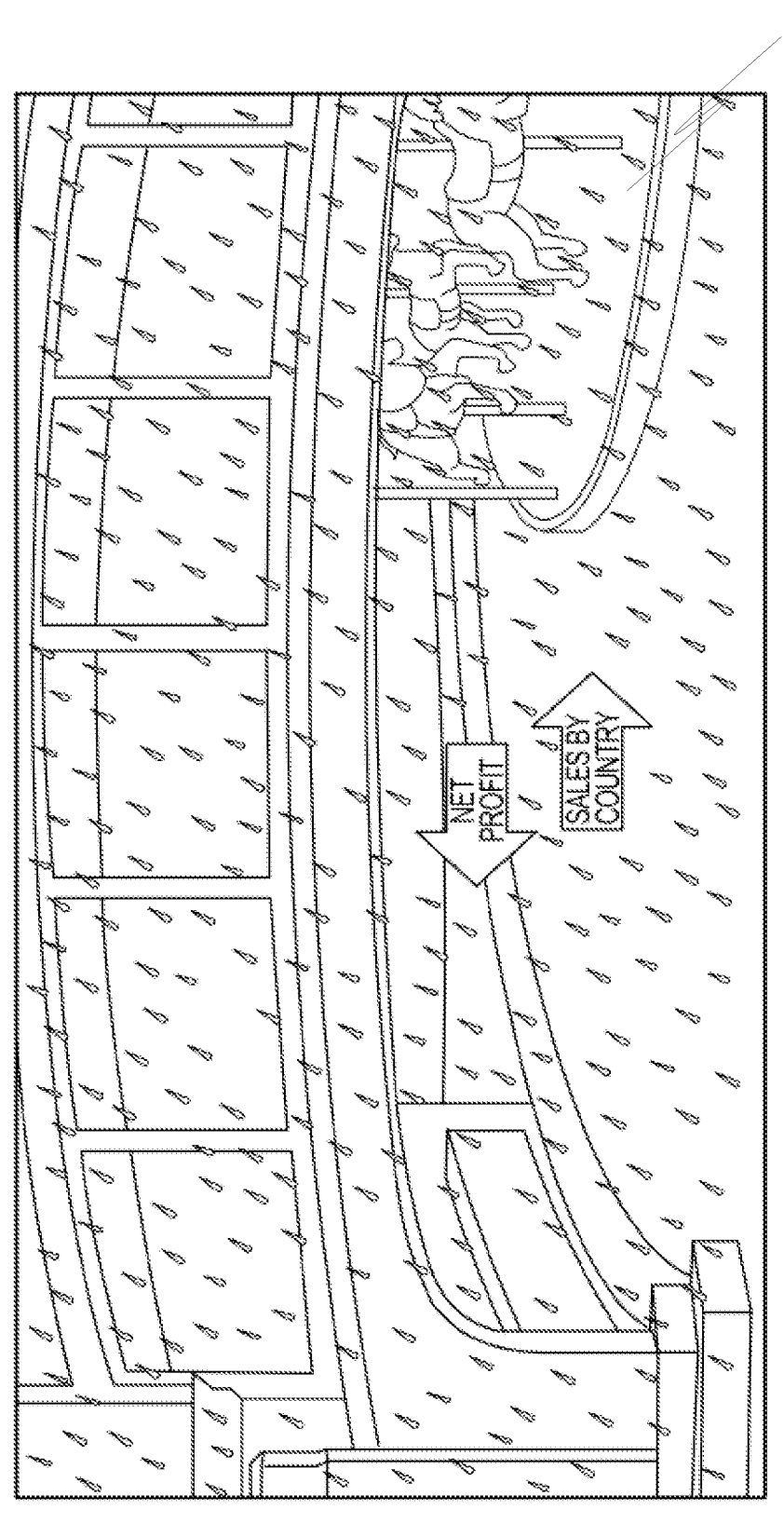
FIG. 5 is a diagram illustrating a second screen capture of the first virtual universe, in accordance with an example embodiment.

FIG. 5 is a diagram illustrating a second screen capture 500 of the first virtual universe, in accordance with an example embodiment. Here, the second screen capture 500 depicts a view from inside the virtual amusement park. The user may navigate an avatar (not pictured) to a carousel 502, which will depict data about sales broken out by country, or to a roller coaster (not pictured), which will depict data about net profit.

Figure 6:
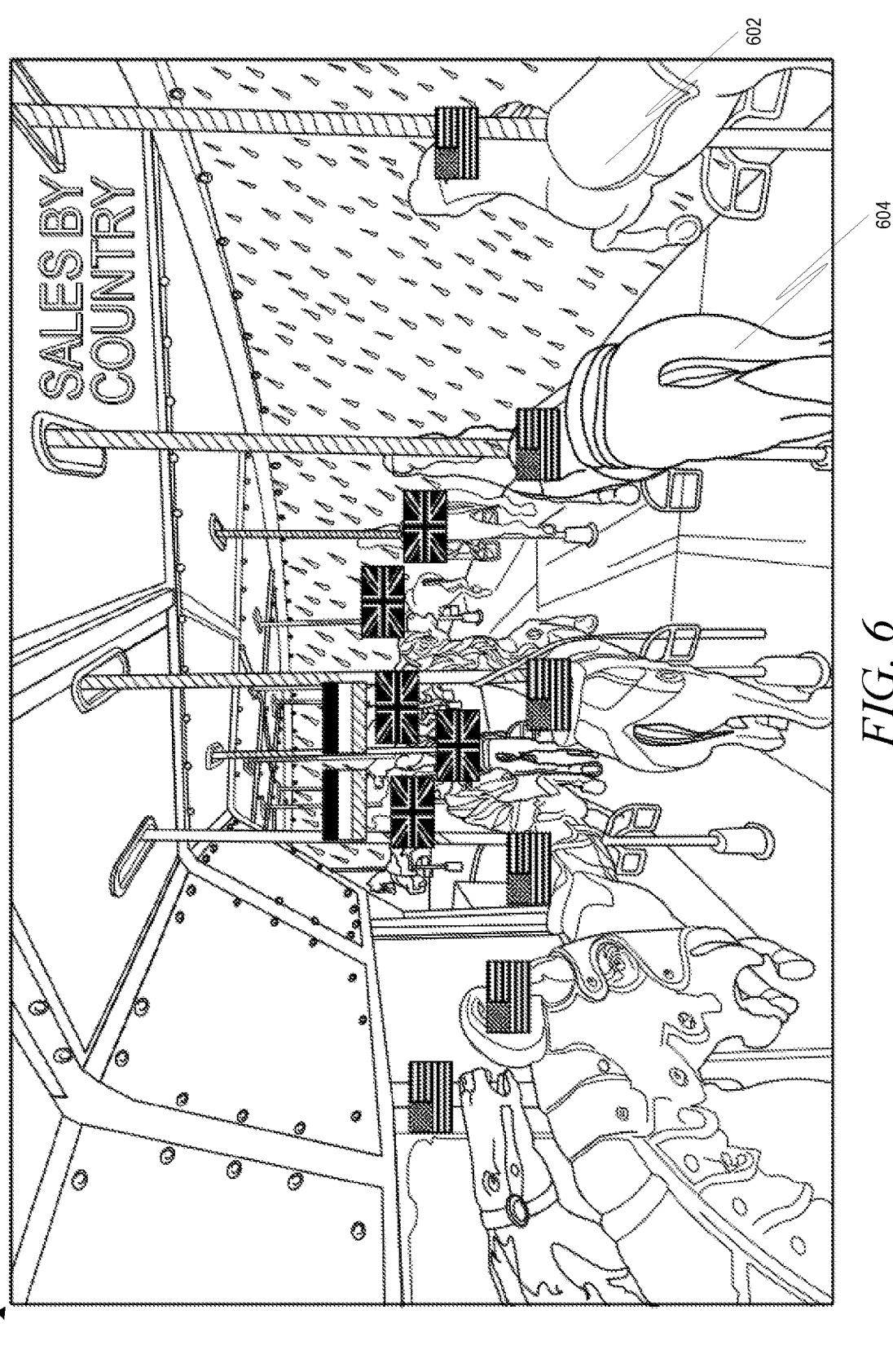
FIG. 6 is a diagram illustrating a third screen capture of the first virtual universe, in accordance with an example embodiment.

FIG. 6 is a diagram illustrating a third screen capture 600 of the first virtual universe, in accordance with an example embodiment. Here, the user has navigated the avatar (not pictured) to the carousel 502. The overall sales are broken out by country, as reflected by the horses having flags representing the various countries in which sales have been made in 2023. The number of horses rendered with a particular flag is reflective of the percentage of overall sales from that country. For example, the majority of horses, such as horses 602, 604, are depicted with United States flags, indicating that the majority of sales took place in the United States.

Figure 7:
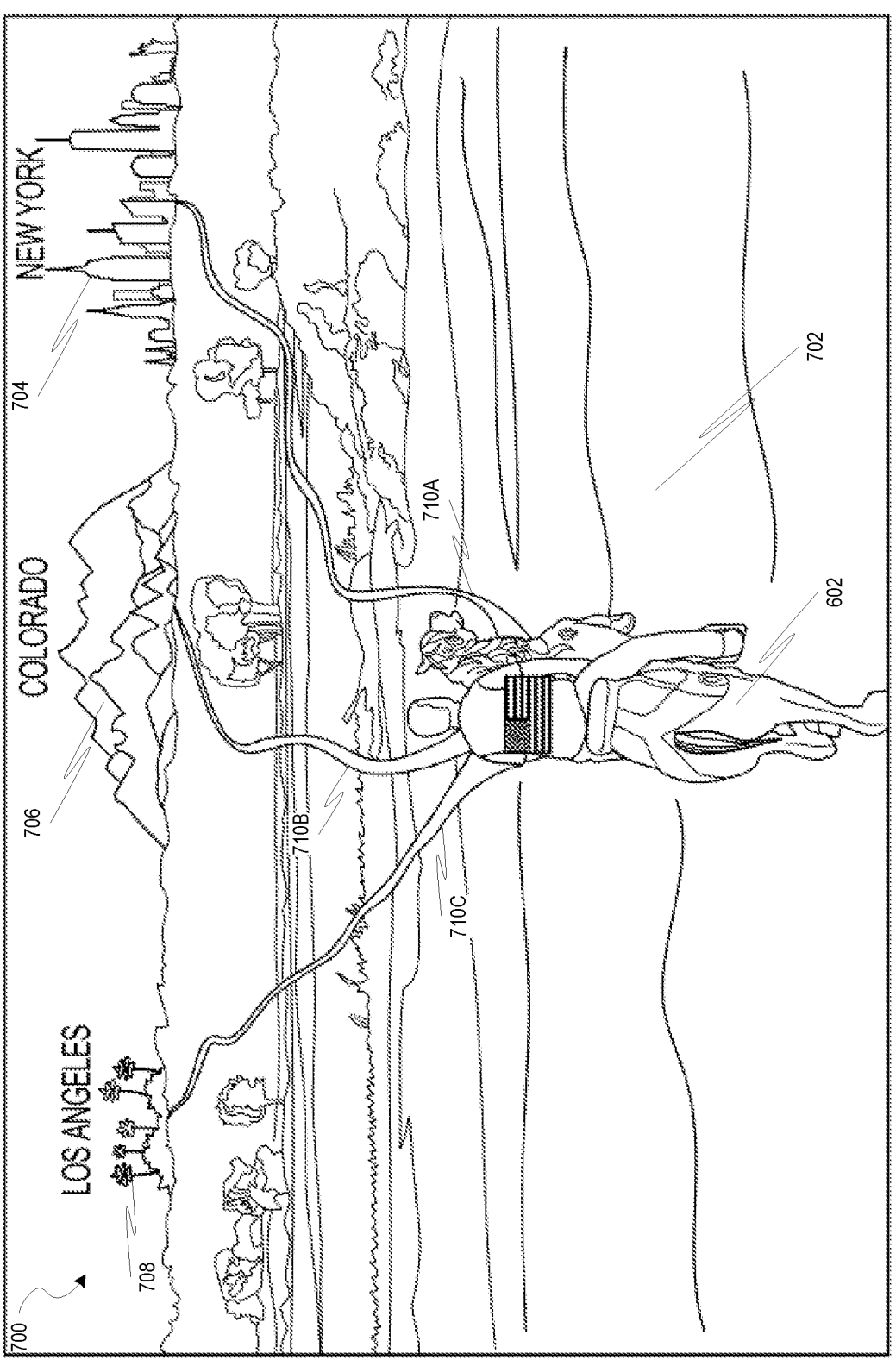
FIG. 7 is a diagram illustrating a fourth screen capture of the first virtual universe, in accordance with an example embodiment.

Should the user wish to obtain more information about one of the regions depicted, he or she can interact with the objects on the screen. For example, in FIG. 6, if the user wanted more details about sales in the U.S., the user could move their avatar to sit on horse 602. This may cause the user's avatar to be transported to a different location. FIG. 7 is a diagram illustrating a fourth screen capture 700 of the first virtual universe, in accordance with an example embodiment. Here, as mentioned previously, the user has navigated the user's avatar to ride on horse 602. The result is that the horse 602 and the user have been transported to a field 702, where the user can see in the distance object representations of different regions of the U.S., such as New York 704 (represented by skyscrapers), Colorado 706 (represented by mountains), and California 708 (represented by palm trees). Also depicted are three paths 710A, 710B,

710C, with the user able to navigate the horse 602 to the path 710A, 710B, 710C corresponding to the state whose data the user wishes to drill down on. So the user can navigate the horse 602 along path 710A to New York 704, at which point the horse can be depicted as riding through the streets of New York, with sales data for New York being represented by different objects on those streets.

The simulation could keep going and going to lower and lower levels. While in New York, for example, the user could navigate the horse to a particular building representing sales from a particular customer (e.g., XYZ Corp.)/Within that building may be a cash register that the user could navigate his avatar to open, with the amount of money in the cash register corresponding to the amount of sales the particular customer contributed.

Figure 8:
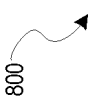
FIG. 8 is a diagram illustrating a fifth screen capture of the first virtual universe, in accordance with an example embodiment.

Turning back to the amusement part, FIG. 8 is a diagram illustrating a fifth screen capture 800 of the first virtual universe, in accordance with an example embodiment. Here, the user has navigated the avatar (not pictured) to the roller coaster 802. Here, net profit is represented by the slope of the roller coaster track at various points representing months of the year. For example, since January sales were slow, the track point 804 is depicted as a low point in the track. Sales began picking up in February and March, causing the track to be rendered with a slight hill at track point 806. Thus, riding the roller coaster allows the user to experience the roller coaster-like metric of sales in 2023, seeing hills when sales were improved and seeing drops when sales were down.

Figure 9:
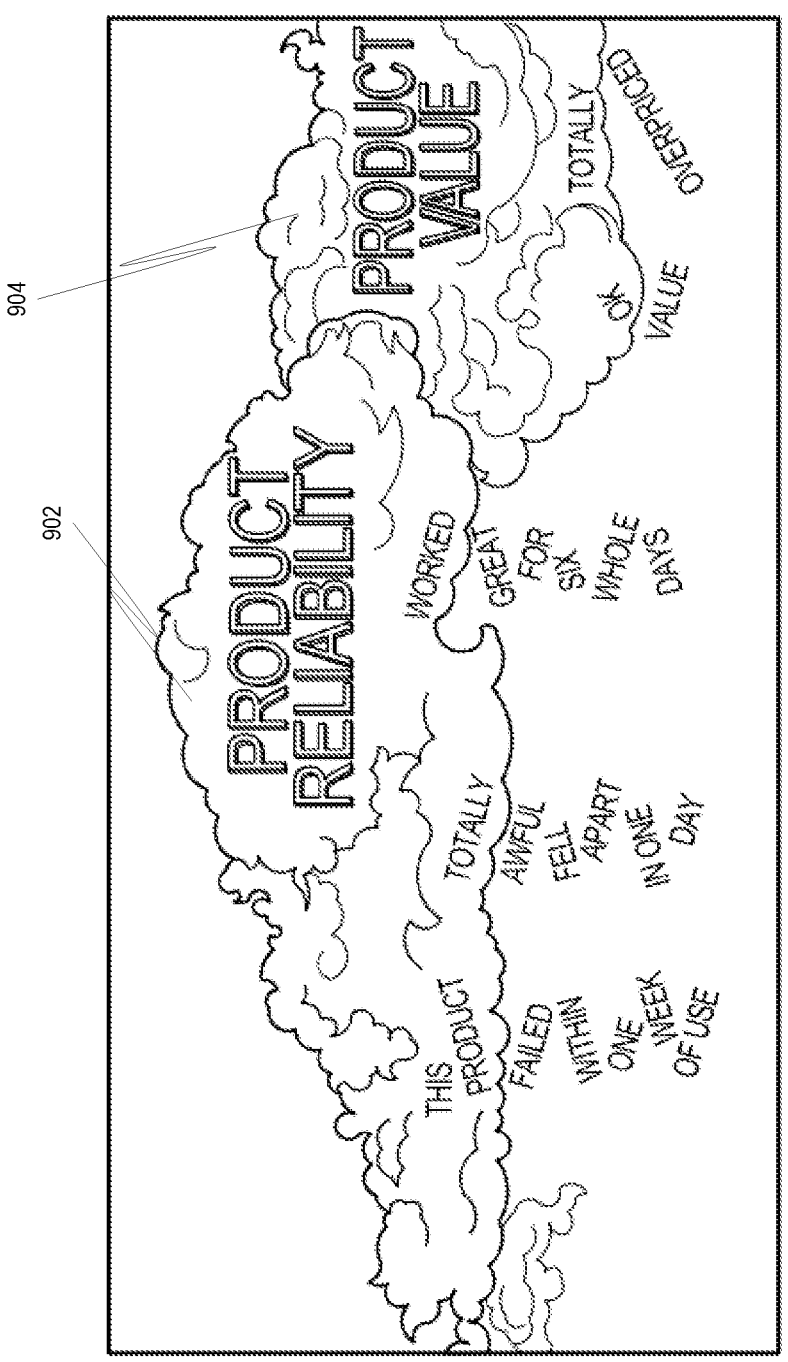
FIG. 9 is a diagram illustrating a first screen capture of a second virtual universe.

FIG. 9 is a diagram illustrating a first screen capture 900 of a second virtual universe. This virtual universe is reflective of customer feedback rather than sales. The first screen capture 900 depicts a number of clouds, such as cloud 902 representing product reliability feedback and cloud 904 representing product value feedback. A user can click on or otherwise select a cloud 902, 904, causing text from actual customer feedback in those corresponding categories to fall from the clouds like rain. While not depicted here, in some example embodiments the clouds 902, 904 may be depicted in a manner that reflects the overall sentiment of the feedback in the corresponding categories. For example, if the majority of feedback in the product reliability category is negative, the cloud 902 may be depicted as a dark cloud, whereas if the majority of feedback in the product value category is positive, the cloud 904 may be depicted as a white, fluffy cloud.

Indeed, it is even possible for the user's avatar to "fly" around the clouds, as it would be possible for flying to occur in any of the virtual universes created.

Other types of objects and properties of objects are possible as well, such as mountains, deserts, oceans, rivers, submarines, ships in the ocean, et., as well as different colors in the object or surrounding environment conveying particular meaning. Risks such as losses or other customized negative key performance indices (KIPs) can also be represented as wild animals (bears, lions, tigers, wolves, etc.) that are spotted during a hike of an avatar, and the features of these animals, such as types, number, severity of attacks, etc. can be portrayed as an experience for the user based on the actual underlying data, subject to customization by a user.

Furthermore, in addition to the virtual reality environments described above, augmented reality (AR) or extended reality (XR), or any combination thereof, can be used within the above-described framework, which can create these environments seamlessly and without lag.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:

at least one hardware processor; and a computer-readable medium storing instructions that, when executed by the at least one hardware processor, cause the at least one hardware processor to perform operations comprising:

accessing first enterprise system data;

transforming the enterprise system data into first training data;

accessing object information about a first set of virtual world objects;

training a first machine learning model by passing the first training data and the object information into a first machine learning algorithm, the training causing the first machine learning model to learn how to create a mapping between enterprise system data and virtual world objects;

accessing second enterprise system data;

transforming the second enterprise system data into first evaluation data;

passing the first evaluation data and a second set of virtual world objects to the trained first machine learning model to produce a mapping between the first evaluation data and the second set of virtual world objects; and causing rendering of one or more virtual world objects contained in the produced mapping in a graphical user interface, the one or more virtual world objects being representations of real-world objects.

Example 2. The system of Example 1, wherein the first evaluation data includes one or more metrics computed from the second enterprise system data.

Example 3. The system of Example 2, wherein the rendering includes representing the one or more metrics using the one or more virtual world objects without text.

Example 4. The system of any of Examples 1-3, wherein the rendering includes rendering the one or more virtual world objects in a first virtual universe, the first virtual universe corresponding to the second enterprise system data, and wherein the operations further comprise:

accessing third enterprise system data, the third enterprise system data corresponding to an identical enterprise as the second enterprise system data;

transforming the third enterprise system data into second evaluation data;

passing the second evaluation data and a third set of virtual world objects in a second virtual universe to the trained first machine learning model to produce a mapping between the second evaluation data and the third set of virtual world objects;

receiving a navigation command in the graphical user interface to navigate from the first virtual universe to the second virtual universe; and in response to the receiving of the navigation command, causing rendering of one or more virtual world objects contained in mapping between the second evaluation data and the third set of virtual world objects in a graphical user interface, the one or more virtual world objects being representations of real-world objects.

Example 5. The system of Example 4, wherein the navigation command includes a movement of an avatar in the first virtual universe.

Example 6. The system of Example 5, wherein the navigation command is a voice command.

Example 7. The system of any of Examples 1-6, further comprising:

receiving feedback via user interactions with the graphical user interface; and causing the first machine learning model to be retrained based on the feedback.

Example 8. A method comprising:

accessing first enterprise system data;

transforming the enterprise system data into first training data;

accessing object information about a first set of virtual world objects;

training a first machine learning model by passing the first training data and the object information into a first machine learning algorithm, the training causing the first machine learning model to learn how to create a mapping between enterprise system data and virtual world objects;

accessing second enterprise system data;

transforming the second enterprise system data into first evaluation data;

passing the first evaluation data and a second set of virtual world objects to the trained first machine learning model to produce a mapping between the first evaluation data and the second set of virtual world objects; and causing rendering of one or more virtual world objects contained in the produced mapping in a graphical user interface, the one or more virtual world objects being representations of real-world objects.

Example 9. The method of Example 8, wherein the first evaluation data includes one or more metrics computed from the second enterprise system data.

Example 10. The method of Example 9, wherein the rendering includes representing the one or more metrics using the one or more virtual world objects without text.

Example 11. The method of any of Examples 8-10, wherein the rendering includes rendering the one or more virtual world objects in a first virtual universe, the first virtual universe corresponding to the second enterprise system data, and wherein the method further comprises:

accessing third enterprise system data, the third enterprise system data corresponding to an identical enterprise as the second enterprise system data;

transforming the third enterprise system data into second evaluation data;

passing the second evaluation data and a third set of virtual world objects in a second virtual universe to the trained first machine learning model to produce a mapping between the second evaluation data and the third set of virtual world objects;

receiving a navigation command in the graphical user interface to navigate from the first virtual universe to the second virtual universe; and in response to the receiving of the navigation command, causing rendering of one or more virtual world objects contained in mapping between the second evaluation data and the third set of virtual world objects in a graphical user interface, the one or more virtual world objects being representations of real-world objects.

Example 12. The method of Example 11, wherein the navigation command includes a movement of an avatar in the first virtual universe.

Example 13. The method of Example 12, wherein the navigation command is a voice command.

Example 14. The method of any of Examples 8-13, further comprising:

receiving feedback via user interactions with the graphical user interface; and causing the first machine learning model to be retrained based on the feedback.

Example 15. A non-transitory machine-readable medium storing instructions which, when executed by one or more processors, cause the one or more processors to perform operations comprising:

accessing first enterprise system data;

transforming the enterprise system data into first training data;

accessing object information about a first set of virtual world objects;

training a first machine learning model by passing the first training data and the object information into a first machine learning algorithm, the training causing the first machine learning model to learn how to create a mapping between enterprise system data and virtual world objects;

accessing second enterprise system data;

transforming the second enterprise system data into first evaluation data;

passing the first evaluation data and a second set of virtual world objects to the trained first machine learning model to produce a mapping between the first evaluation data and the second set of virtual world objects; and causing rendering of one or more virtual world objects contained in the produced mapping in a graphical user interface, the one or more virtual world objects being representations of real-world objects.

Example 16. The non-transitory machine-readable medium of Example 15, wherein the first evaluation data includes one or more metrics computed from the second enterprise system data.

Example 17. The non-transitory machine-readable medium of Example 16, wherein the rendering includes representing the one or more metrics using the one or more virtual world objects without text.

Example 18. The non-transitory machine-readable medium of any of Examples 15-17, wherein the rendering includes rendering the one or more virtual world objects in a first virtual universe, the first virtual universe corresponding to the second enterprise system data, and wherein the operations further comprise:

accessing third enterprise system data, the third enterprise system data corresponding to an identical enterprise as the second enterprise system data;

transforming the third enterprise system data into second evaluation data;

passing the second evaluation data and a third set of virtual world objects in a second virtual universe to the trained first machine learning model to produce a mapping between the second evaluation data and the third set of virtual world objects;

receiving a navigation command in the graphical user interface to navigate from the first virtual universe to the second virtual universe; and in response to the receiving of the navigation command, causing rendering of one or more virtual world objects contained in mapping between the second evaluation data and the third set of virtual world objects in a graphical user interface, the one or more virtual world objects being representations of real-world objects.

Example 19. The non-transitory machine-readable medium of Example 18, wherein the navigation command includes a movement of an avatar in the first virtual universe.

Example 20. The non-transitory machine-readable medium of Example 19, wherein the navigation command is a voice command.

Figure 10:
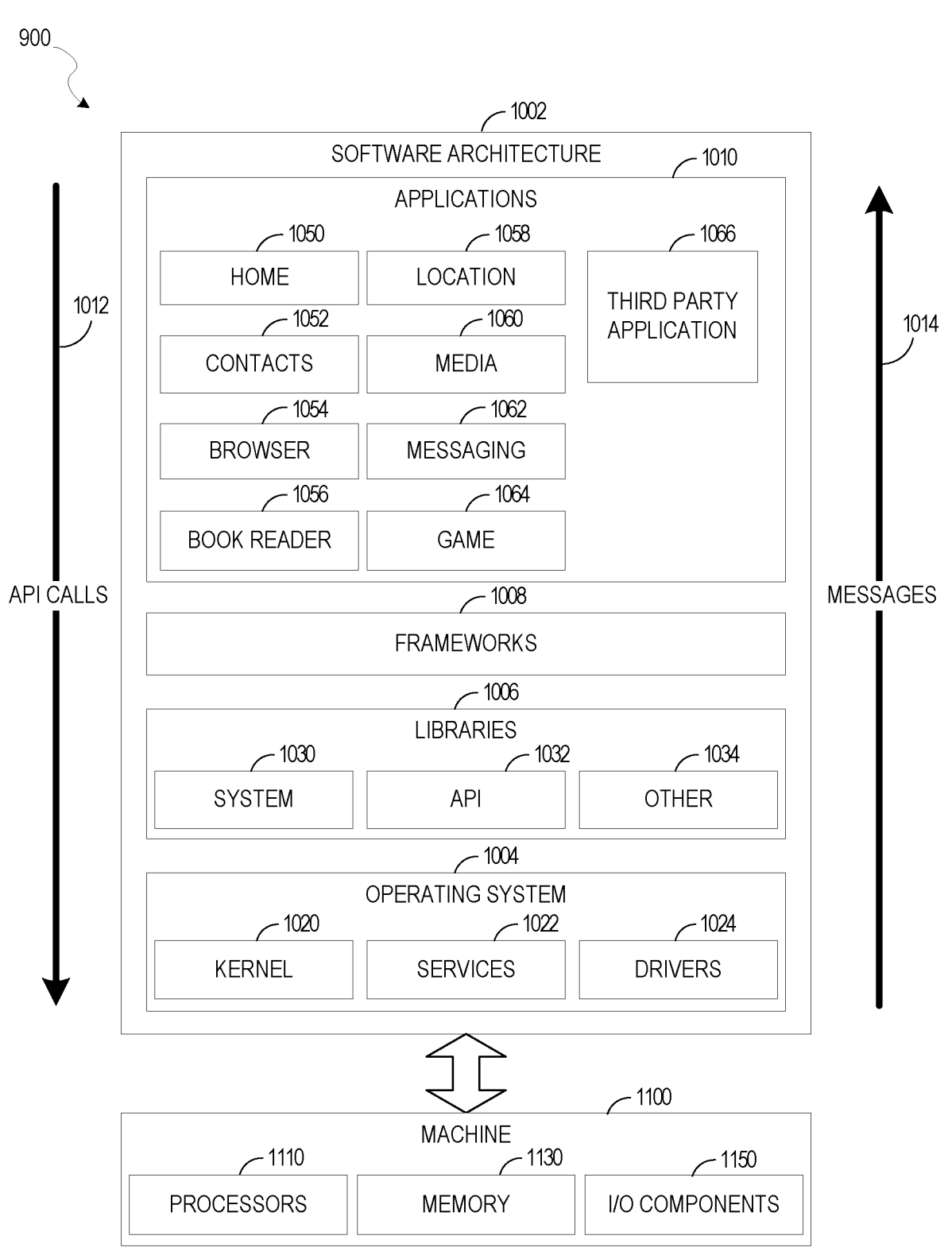
FIG. 10 is a block diagram illustrating a software architecture, which can be installed on any one or more of the devices described above.

FIG. 10 is a block diagram 1000 illustrating a software architecture 1002, which can be installed on any one or more of the devices described above. FIG. 10 is merely a non-limiting example of a software architecture, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and input/output (I/O) components 1150. In this example architecture, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware. For instance, the drivers 1024 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 [MPEG4], Advanced Video Coding [H.264 or AVC], Moving Picture Experts Group Layer-3 [MP3], Advanced Audio Coding [AAC], Adaptive Multi-Rate [AMR] audio codec, Joint Photographic Experts Group [PEG or JPG], or Portable Network Graphics [PNG]), graphics libraries (e.g., an OpenGL framework used to render in two-dimensional [2D] and three-dimensional [3D] in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010. For example, the frameworks 1008 provide various GUI functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications, such as a third-party application 1066. The applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit [SDK] by an entity other than the vendor of the particular platform) may be mobile software running on a mobile operating system such as IOS™, ANDROID™ WINDOWS® Phone, or another mobile operating system. In this example, the third-party application 1066 can invoke the API calls 1012 provided by the operating system 1004 to facilitate functionality described herein.

Figure 11:
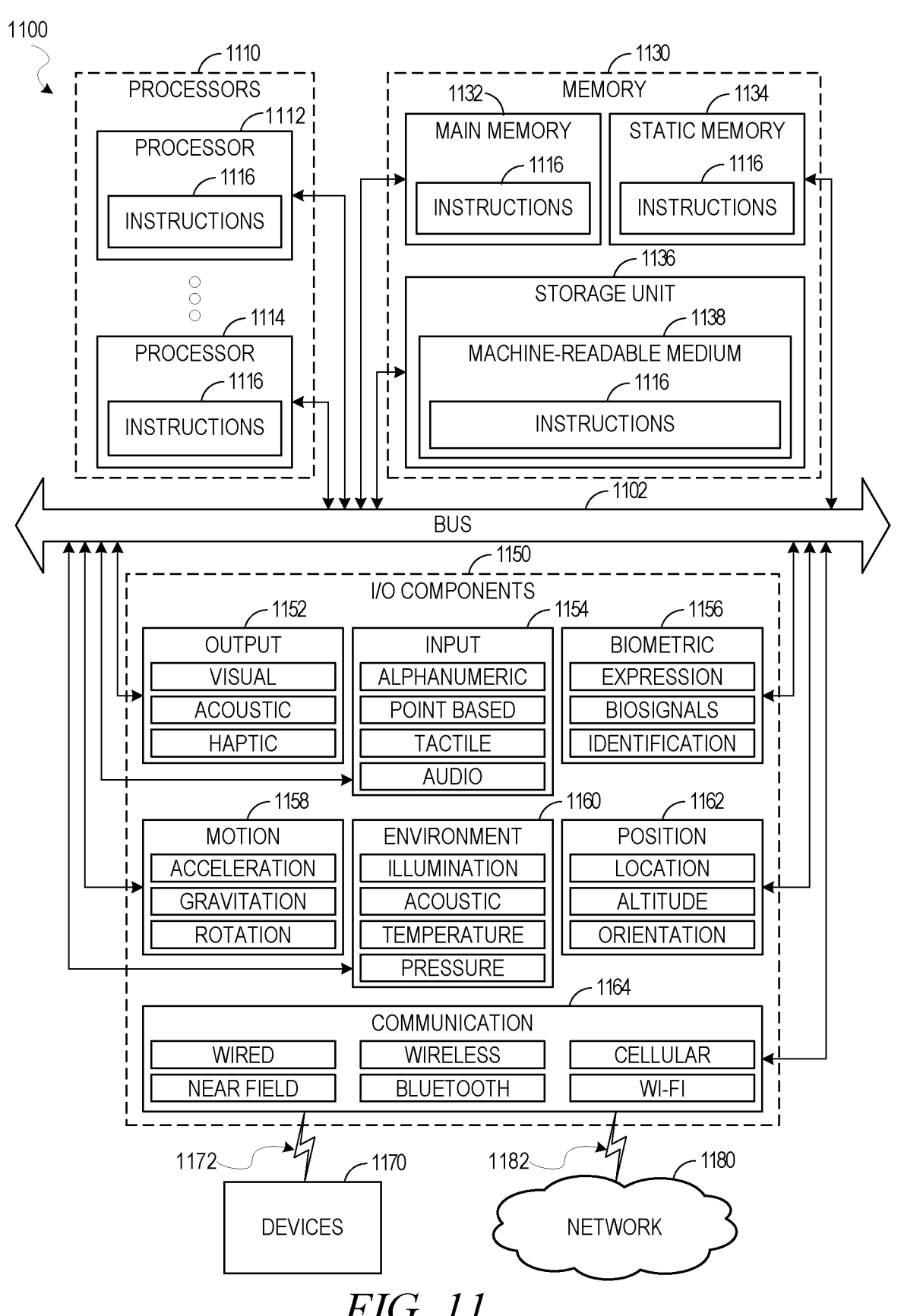
FIG. 11 illustrates a diagrammatic representation of a machine in the form of a computer system within which a set of instructions may be executed for causing the machine to perform any one or more of the methodologies discussed herein.

FIG. 11 illustrates a diagrammatic representation of a machine 1100 in the form of a computer system within which a set of instructions may be executed for causing the machine 1100 to perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the method of FIG. 3. Additionally, or alternatively, the instructions 1116 may implement FIGS. 1-9 and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer [or distributed] network environment. The machine 1100 may comprise, but not be limited to, a server computer, a client computer, a personal computer [PC], a tablet computer, a laptop computer, a netbook, a set-top box [STB], a personal digital assistant [PDA], an entertainment media system, a cellular telephone, a smart phone, a mobile device, a wearable device [e.g., a smart watch], a smart home device [e.g., a smart appliance], other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a central processing unit [CPU], a reduced instruction set computing [RISC] processor, a complex instruction set computing [CISC] processor, a graphics processing unit [GPU], a digital signal processor [DSP], an application-specific integrated circuit [ASIC], a radio-frequency integrated circuit [RFIC], another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1112, 1114 with a single core, multiple processors 1112, 1114 with multiple cores, or any combination thereof.

The memory 1130 may include a main memory 1132, a static memory 1134, and a storage unit 1136, each accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel [PDP], a light-emitting diode [LED] display, a liquid crystal display [LCD], a projector, or a cathode ray tube [CRT]), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., coupled via a USB).

Moreover, the communication components 1164 may detect identifiers or include components operable to detect identifiers. For example, the communication components 1164 may include radio-frequency identification (RFID) tag reader components, NFC smart tag detection components, optical reader components (e.g., an optical sensor to detect one-dimensional bar codes such as Universal Product Code [UPC] bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

The various memories (i.e., 1130, 1132, 1134, and/or memory of the processor(s) 1110) and/or the storage unit 1136 may store one or more sets of instructions 1116 and data structures (e.g., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor;
a computer-readable medium storing instructions that, when executed by the at least one hardware processor, cause the at least one hardware processor to perform operations comprising:
accessing first enterprise system data;
transforming the enterprise system data into first training data;
accessing object information about a first set of virtual world objects;
training a first machine learning model by passing the first training data and the object information into a first machine learning algorithm, the training causing the first machine learning model to learn how to create a mapping between enterprise system data and virtual world objects;
accessing second enterprise system data;
transforming the second enterprise system data into first evaluation data;
passing the first evaluation data and a second set of virtual world objects to the trained first machine learning model to produce a mapping between the first evaluation data and the second set of virtual world objects; and
causing rendering of one or more virtual world objects contained in the produced mapping in a graphical user interface, the one or more virtual world objects being representations of real-world objects, at least one of the one or more virtual objects corresponding to a plurality of data points in underlying enterprise system data and being rendered in a manner that reflects relationships among the plurality of data points.

2. The system of claim 1, wherein the first evaluation data includes one or more metrics computed from the second enterprise system data.

3. The system of claim 2, wherein the rendering includes representing the one or more metrics using the one or more virtual world objects without text.

4. The system of claim 1, wherein the rendering includes rendering the one or more virtual world objects in a first virtual universe, the first virtual universe corresponding to the second enterprise system data, and wherein the operations further comprise:
accessing third enterprise system data, the third enterprise system data corresponding to an identical enterprise as the second enterprise system data;
transforming the third enterprise system data into second evaluation data;
passing the second evaluation data and a third set of virtual world objects in a second virtual universe to the trained first machine learning model to produce a mapping between the second evaluation data and the third set of virtual world objects;
receiving a navigation command in the graphical user interface to navigate from the first virtual universe to the second virtual universe; and
in response to the receiving of the navigation command, causing rendering of one or more virtual world objects contained in mapping between the second evaluation data and the third set of virtual world objects in a graphical user interface, the one or more virtual world objects being representations of real-world objects.

5. The system of claim 4, wherein the navigation command includes a movement of an avatar in the first virtual universe.

6. The system of claim 5, wherein the navigation command is a voice command.

7. The system of claim 1, further comprising:
receiving feedback via user interactions with the graphical user interface; and
causing the first machine learning model to be retrained based on the feedback.

8. A method comprising:
accessing first enterprise system data;
transforming the enterprise system data into first training data;
accessing object information about a first set of virtual world objects;
training a first machine learning model by passing the first training data and the object information into a first machine learning algorithm, the training causing the first machine learning model to learn how to create a mapping between enterprise system data and virtual world objects;
accessing second enterprise system data;
transforming the second enterprise system data into first evaluation data;
passing the first evaluation data and a second set of virtual world objects to the trained first machine learning model to produce a mapping between the first evaluation data and the second set of virtual world objects; and
causing rendering of one or more virtual world objects contained in the produced mapping in a graphical user interface, the one or more virtual world objects being representations of real-world objects, at least one of the one or more virtual objects corresponding to a plurality of data points in underlying enterprise system data and being rendered in a manner that reflects relationships among the plurality of data points.

9. The method of claim 8, wherein the first evaluation data includes one or more metrics computed from the second enterprise system data.

10. The method of claim 9, wherein the rendering includes representing the one or more metrics using the one or more virtual world objects without text.

11. The method of claim 8, wherein the rendering includes rendering the one or more virtual world objects in a first virtual universe, the first virtual universe corresponding to the second enterprise system data, and wherein the method further comprises:

accessing third enterprise system data, the third enterprise system data corresponding to an identical enterprise as the second enterprise system data;

transforming the third enterprise system data into second evaluation data;

passing the second evaluation data and a third set of virtual world objects in a second virtual universe to the trained first machine learning model to produce a mapping between the second evaluation data and the third set of virtual world objects;

receiving a navigation command in the graphical user interface to navigate from the first virtual universe to the second virtual universe; and in response to the receiving of the navigation command, causing rendering of one or more virtual world objects contained in mapping between the second evaluation data and the third set of virtual world objects in a graphical user interface, the one or more virtual world objects being representations of real-world objects.

12. The method of claim 11, wherein the navigation command includes a movement of an avatar in the first virtual universe.

13. The method of claim 12, wherein the navigation command is a voice command.

14. The method of claim 8, further comprising:

receiving feedback via user interactions with the graphical user interface; and causing the first machine learning model to be retrained based on the feedback.

15. A non-transitory machine-readable medium storing instructions which, when executed by one or more processors, cause the one or more processors to perform operations comprising:

accessing first enterprise system data;

transforming the enterprise system data into first training data;

accessing object information about a first set of virtual world objects;

training a first machine learning model by passing the first training data and the object information into a first machine learning algorithm, the training causing the first machine learning model to learn how to create a mapping between enterprise system data and virtual world objects;

accessing second enterprise system data;

transforming the second enterprise system data into first evaluation data;

passing the first evaluation data and a second set of virtual world objects to the trained first machine learning model to produce a mapping between the first evaluation data and the second set of virtual world objects; and causing rendering of one or more virtual world objects contained in the produced mapping in a graphical user interface, the one or more virtual world objects being representations of real-world objects, at least one of the one or more virtual objects corresponding to a plurality of data points in underlying enterprise system data and being rendered in a manner that reflects relationships among the plurality of data points.

16. The non-transitory machine-readable medium of claim 15, wherein the first evaluation data includes one or more metrics computed from the second enterprise system data.

17. The non-transitory machine-readable medium of claim 16, wherein the rendering includes representing the one or more metrics using the one or more virtual world objects without text.

18. The non-transitory machine-readable medium of claim 15, wherein the rendering includes rendering the one or more virtual world objects in a first virtual universe, the first virtual universe corresponding to the second enterprise system data, and wherein the operations further comprise:

accessing third enterprise system data, the third enterprise system data corresponding to an identical enterprise as the second enterprise system data;

transforming the third enterprise system data into second evaluation data;

passing the second evaluation data and a third set of virtual world objects in a second virtual universe to the trained first machine learning model to produce a mapping between the second evaluation data and the third set of virtual world objects;

receiving a navigation command in the graphical user interface to navigate from the first virtual universe to the second virtual universe; and in response to the receiving of the navigation command, causing rendering of one or more virtual world objects contained in mapping between the second evaluation data and the third set of virtual world objects in a graphical user interface, the one or more virtual world objects being representations of real-world objects.

19. The non-transitory machine-readable medium of claim 18, wherein the navigation command includes a movement of an avatar in the first virtual universe.

20. The non-transitory machine-readable medium of claim 19, wherein the navigation command is a voice command.

* * * * *